United States Patent [19]

Peterson

[11] 4,062,752

[45] Dec. 13, 1977

[54] PLATING MECHANISM

[76] Inventor: Myron Lester Peterson, 3015 Cedar St., Las Vegas, Nev. 89104

[21] Appl. No.: 729,304

[22] Filed: Oct. 4, 1976

[51] Int. Cl.² ...................... C25D 17/16; C25D 17/10
[52] U.S. Cl. .................................. 204/213; 204/201
[58] Field of Search ............... 204/201, 213, 199, 200, 204/284, 285, 287, 288

[56] References Cited

U.S. PATENT DOCUMENTS

| 360,852 | 4/1887 | Cassel | 204/213 |
|---|---|---|---|
| 908,439 | 1/1909 | Backus | 204/213 |
| 1,342,899 | 6/1920 | Eddy | 204/201 X |
| 1,557,474 | 10/1925 | Farrand | 204/201 |
| 1,912,400 | 6/1933 | O'Neill | 204/201 |
| 2,133,324 | 10/1938 | Hosdowich | 204/201 |
| 2,856,345 | 10/1958 | Pociask | 204/285 |
| 2,975,120 | 3/1961 | Kenmore et al. | 204/207 |
| 3,421,992 | 1/1969 | Lazaro | 204/213 |

FOREIGN PATENT DOCUMENTS

| 702,863 | 4/1931 | France | 204/201 |
|---|---|---|---|
| 253,959 | 12/1948 | Switzerland | 204/201 |

*Primary Examiner*—F.C. Edmundson
*Attorney, Agent, or Firm*—Edward E. Roberts

[57] ABSTRACT

There is provided a plating system comprising a series of plating and/or processing tanks with spiral grooved plating and processing barrels. The spiral groove is located interally of the barrels which are substantially hollow. The spiral groove or channel is arranged to automatically translate the material to be plated through the barrels. In addition, each barrel includes a chute at the end of the spiral groove. The chute is arranged such that the plated material from one barrel is automatically transferred into the adjacent barrel or the like wherein no manual labor is required. Internally of at least one of the barrels is disposed a plating unit comprising a plurality of individual, flexible strips which contact material to be plated thereby determining the polarity of the material and assisting in the plating process.

10 Claims, 9 Drawing Figures

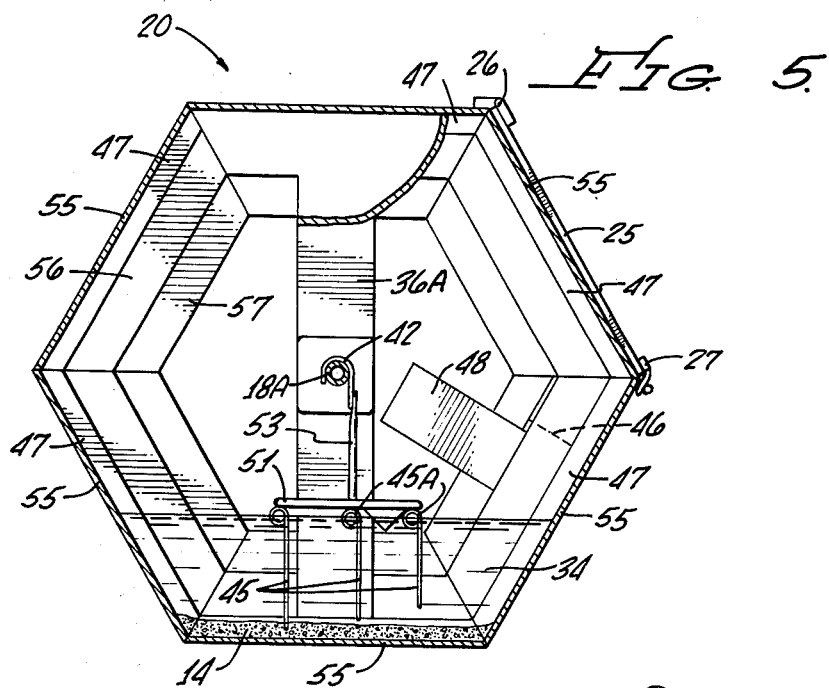
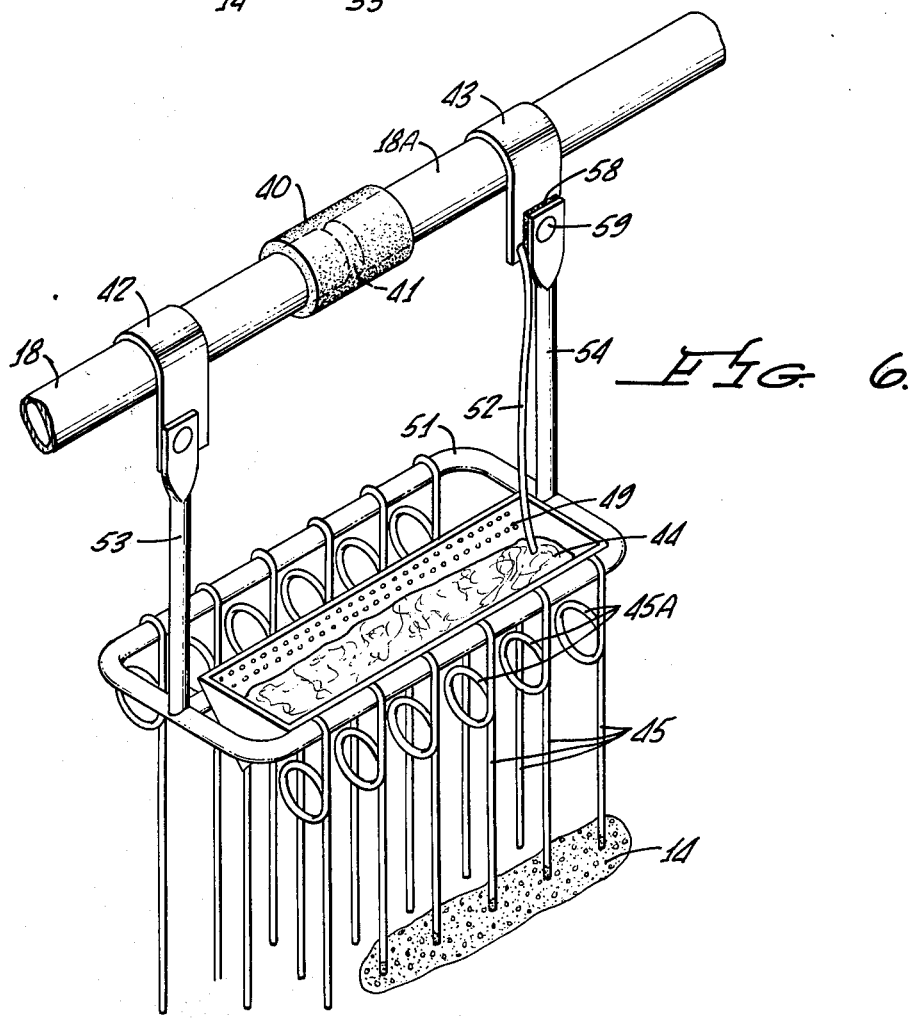

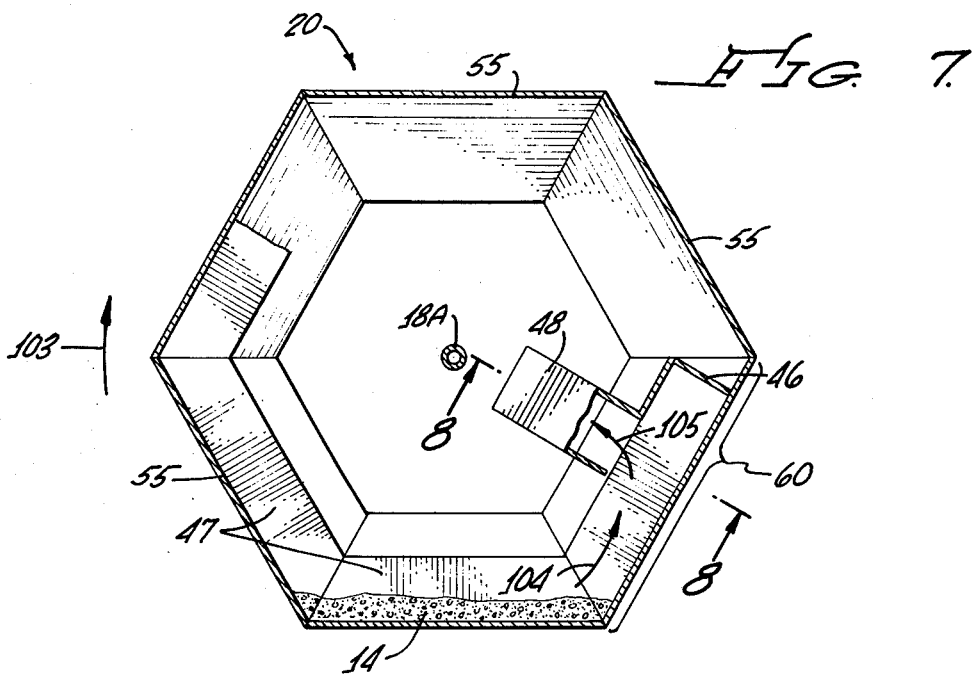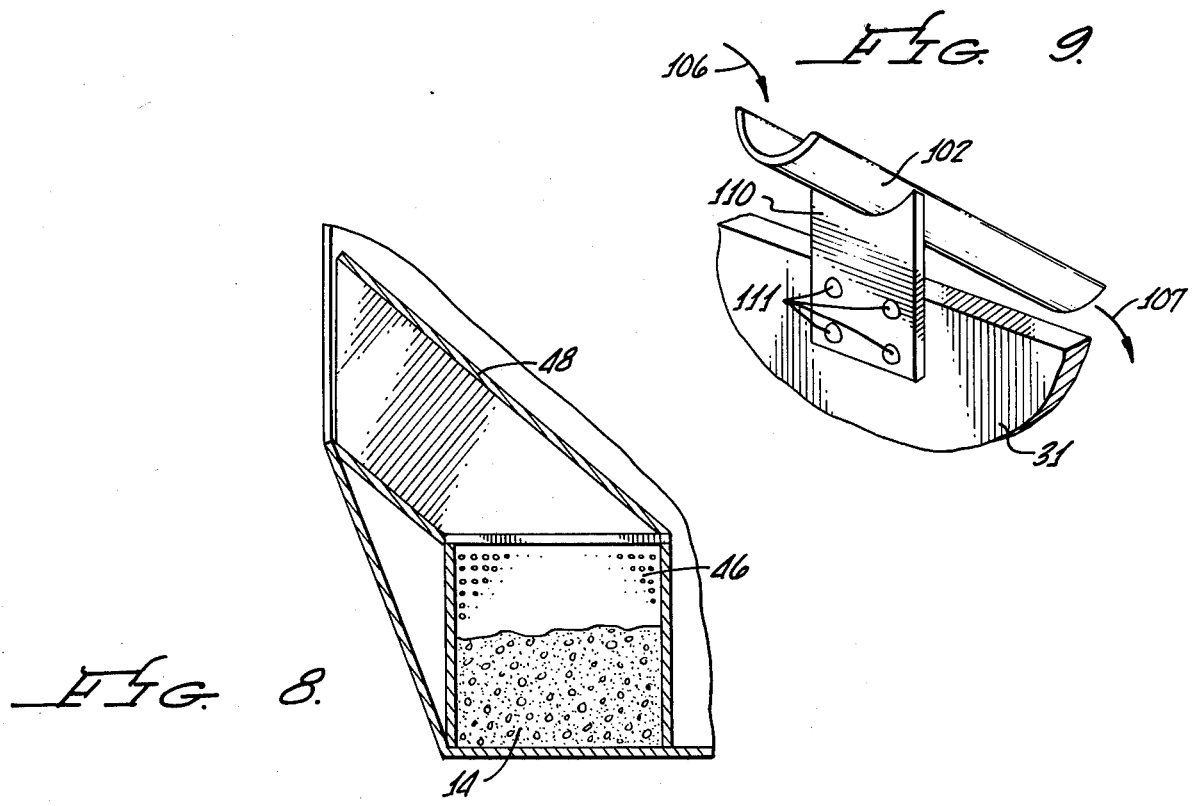

PLATING MECHANISM

BACKGROUND

1. Field of the Invention

This invention relates to barrel plating systems, in general, and to automated barrel plating systems which require little or no manual labor.

2. Prior Art

There are many known plating systems currently in existence. Some of these systems are arranged in custom engineered, modular units. However, for the most part these known systems do not have the capability of automatically transferring material from one plating tank to an adjacent plating or processing tank. Typically, the known systems use a polypropylene tank which is substantially rectangular in configuration and placed in a unit which is similar to a free standing household washing or drying machine. In each of these instances, it is generally required that the operator insert the material to be plated into the tank, add the solution and the plating material, and set the automatic controls for the appropriate plating action. However, when the next process step is to be achieved, the plated material must be removed from the first processing tank and physically transported to another processing tank for further operation. This process is both time consuming and expensive. In addition, during this time errors may creep into the processing arrangement due to the lack of automatic control. In addition, other errors or error conditions can be encountered during the manual transfer of materials from one processing tank to the other.

Consequently, the known systems suffer from various problems and shortcomings. It is highly desirable to overcome these shortcomings in order to make any plating operation more cost effective and more accurate.

SUMMARY OF THE INVENTION

In this invention, a modular plating system is provided. One or more plating tanks are arranged in series. Each of the plating tanks includes a spiral groove or channel around the inner surface thereof. The inner channel is arranged to effectively translate the material to be plated in a substantially helical path through the barrel. Each barrel includes, at the end thereof and communicating with the channel, a chute which is arranged such that the plated material is automatically discharged from the tank when it reaches the end of the spiral groove or channel. This plated material may be discharged into an adjacent tank for a further process step or may be discharged into a final disposition bin or the like.

In at least one of the tanks there is disposed a contact arrangement comprising a plurality of flexible rod-like members which are resiliently mounted to conduct current from the source to the material to be plated. The contacts are arranged to be in continual wiping contact with the material to be plated during the operation of the tank in the processing cycle.

BRIEF DESCRIPTION OF THE DRAWINGS

FIG. 5 is an end, cross-sectional view of one of the barrels of the instant invention.

FIG. 6 is a perspective view of the contact arrangement used in the instant invention.

FIG. 7 is partially cross-sectional end-view of a barrel showing an exit chute.

FIG. 8 is a cross-sectional side view of the output chute arrangement.

FIG. 9 is a perspective view of the between-bin chute arrangement.

DESCRIPTION OF A PREFERRED EMBODIMENT

Figure 1:
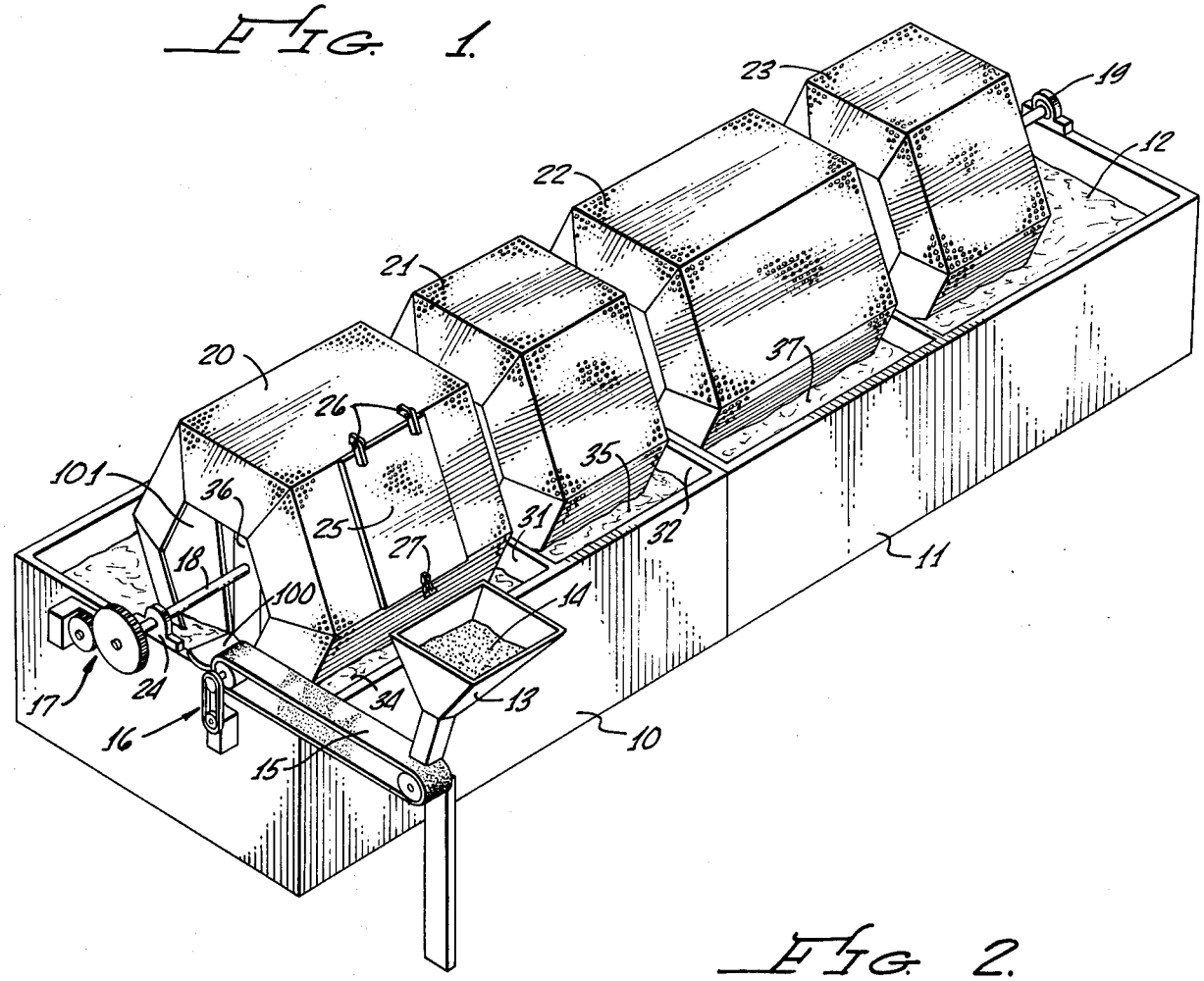
FIG. 1 is a perspective view of an illustrative arrangement of a plurality of barrels arranged according to the instant invention.

In the following description and the accompanying drawings, similar components bear similar reference numerals.

Referring now to FIG. 1, there is shown a perspective view of the plating system utilizing the instant invention. While the invention is not limited to the number of components shown, this illustrative showing includes tanks 10 and 11. These tanks may be considered to be substantially similar. Of course, the tanks may be different as well. The tanks represent no portion of the invention, per se. A plurality of bins 20, 21, 22 and 23 are shown arranged adjacent to one another. The number of bins, again, is not limitative of the invention. Moreover, bins 20 through 23 may be substantially identical or they may be of somewhat different configuration, especially in terms of length thereof. For example, in the illustrative embodiment, bins 20 and 22 are shown as being somewhat elongated relative to bins 21 and 23. Regardless of the length of the bins, the internal construction thereof is substantially similar. Consequently, only one or two of the bins need be described in detail.

It is noted that bin 20 is substantially octagonal in overall appearance. Door 25 is provided in one side of the bin and is attached to the bin by several hinges 26. A suitable latch 27 is arranged to maintain door 25 in the closed position when desirable. The configuration and arrangement of hinges 26 and latch 27 are not critical to this invention. However, in a preferred embodiment these elements are fabricated of a material which will not be effected by a plating bath or the like.

Bin 20 (as well as bins 21, 22 and 23) is mounted on a suitable rod or shaft 18. Shaft 18 is mounted at a suitable structure or strut 36 which is formed adjacent one end in bin 26. Strut 36 may in some cases, form a part of bulkhead 101. Additional support structures or struts are provided in bin 20 as well as the additional bins. In this invention any suitable number of struts can be incorporated into any and all barrels.

Shaft 18, which is preferably of an electrically conductive material, is mounted in a suitable bearing contact member 24. In addition, shaft 18 is fastened, in a suitable manner, to any suitable prime mover mechanism 17. The mechanism illustrated is a motor and gear train to control the speed of operation of shaft 18. Inasmuch as shaft 18 is fixed to strut 36 in bin 20, rotation of shaft 18 causes rotation of bin 20. Similar arrangements cause rotation of the other bins.

Hopper 13 is arranged to receive material 14 which is to be electroplated. Hopper 13 directs material 14 onto a suitable conveying mechanism such as belt 15. Belt 15 is controlled and driven by a suitable prime mover mechanism 16. In a preferred embodiment arrangement may be made wherein hopper 13 is controlled to selectively supply material 14 to belt 15 in response to a signal produced by mover mechanism 16. Material 14 is deposited into bin 20 from belt 15 via chute 100.

Tanks 10 and 11 are indicated as individual tanks. It should be understood that tanks 10 and 11 may in fact represent a single tank having a bulkhead therebetween. The important feature is that tanks 10 and 11 include bulkheads 31 and 32 wherein plating or other solutions 34, 35, 37 or 12 are maintained separate from each other. The number of tanks and/or bulkheads is a function of the plating mechanism and process which is utilized.

Typically, each of bins 20 through 23 will be placed in a separate solution in one of the tank portions. For example, solution 34 may be a plating solution of a type known in the art while solution 35 may be a rinse solution such as deionized water or the like. An additional plating solution 37, another rinse solution 12 and so forth, may be utilized. Of course, any of the solutions may have any suitable or desired function in accordance with the plating process involved.

Thus, in a typical operation, material 14 (to be plated) is deposited via hopper 13, belt 15 and chute 100 into the channel or groove (described in more detailed infra) in bin 20. Bulkhead 101 is desirable to assure that material 14 is deposited into the first revolution of the groove. Moving mechanism 17 causes shaft 18 to rotate. Inasmuch as shaft 18 is fixed to bin 20 by means of strut 36, bin 20 (as well as other bins) also rotates in accordance with the operation of dirve mechanism 17. Because of the groove or channel described internally of bin 20 (and the other bins), material 14 to be plated is effectively translated from left-to-right in the embodiment shown in FIG. 1. This translation is automatic without any manual operations involved. The fully plated or treated material emerges from the end bin, e.g. bin 23, having been fully processed without human intervention.

Figure 2:
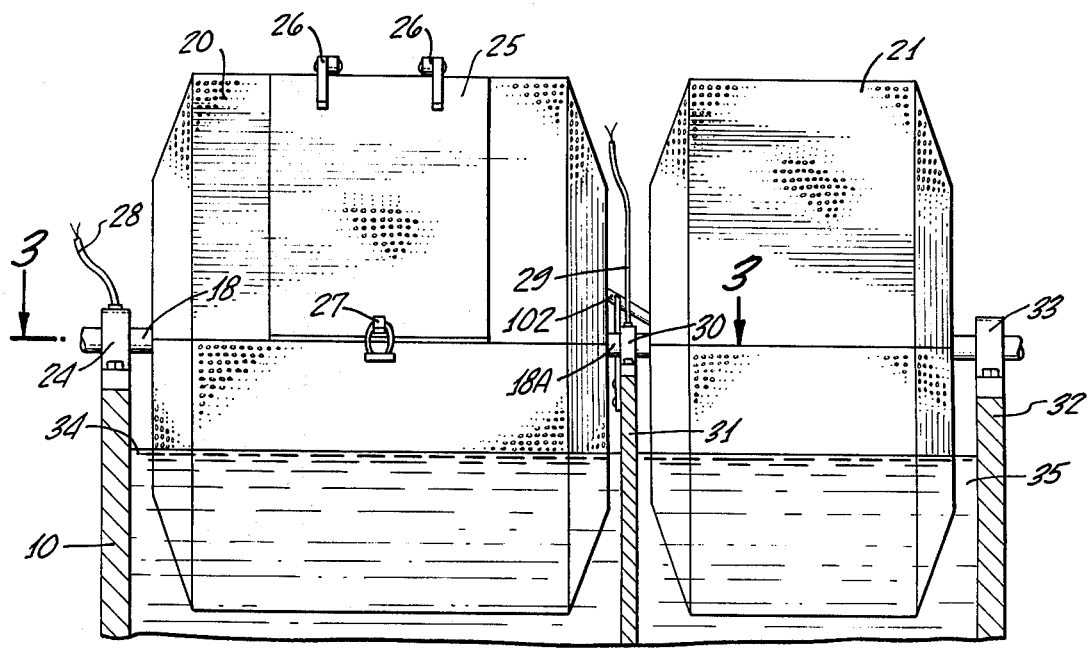
FIG. 2 is an elevation view of some of the barrels shown in FIG. 1.

Referring now to FIG. 2, there is shown a more detailed arrangement in a side view of bins 20 and 21. Again, door 25 is shown mounted to bin 20 by means of hinges 26 and secured by latch 27. Door 25, in this embodiment comprises a portion of one side of bin 20.

Bin 20 is mounted on shaft 18 which is supported by bearing contact 24. Bearing contact 24 is connected via conductor 28 to a suitable potential source (not shown). Another portion of the shaft, viz shaft 18A, is supported by bearing contact 30. Bearing contact 30 is connected to a suitable potential source (not shown) via conductor 29. It should be understood that the sources which are connected to conductors 28 and 29 may be the opposite sides of the single power supply, battery or the like. It should be understood, however, that conductors 28 and 29 are, typically, connected to opposite polarity poles of the suitable source in order to effect the plating process.

A similar bearing 33 is provided at the opposite end of the shaft of bin 21. If it is assumed that bin 21 represents a rinse cycle or the like, a contact need not be made via bearing 33. If, on the other hand, an additional plating cycle is performed in bin 21, bearing 33 would also be a bearing contact and a suitable conductor (not shown) would be attached thereto.

The bearings 24, 30 and 33 are mounted on suitable tank bulkheads such as bulkheads 31 and 32. These bulkheads may represent bulkheads in tanks 10 and 11 or may represent the walls of these tanks, per se. The bulkheads or walls serve to separate the solutions such as solutions 34 and 35 which are utilized in different cycles or steps in the plating process. As noted supra, solution 34 may be an suitable plating solution while solution 35 may be a rinse solution or the like. Of course, solution 35, (or any of the solutions) may be an etching solution, a polishing solution or the like. The type and order of the solutions are a function of the plating process, and are not a portion of this invention, per se.

Figure 3:
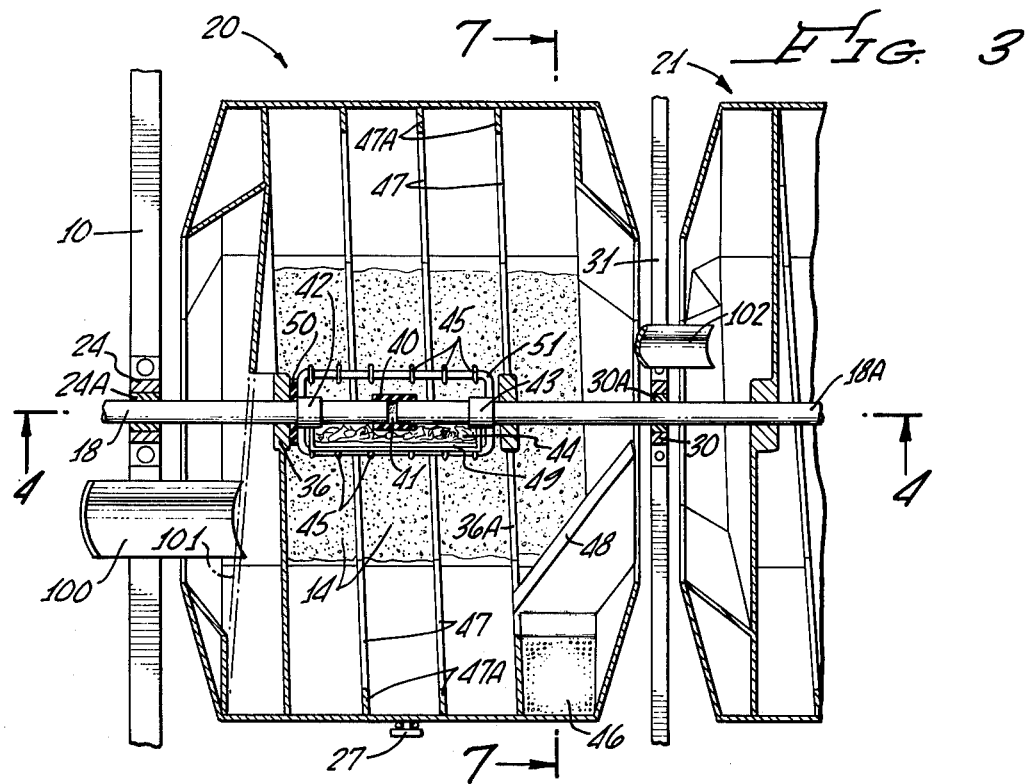
FIG. 3 is a cross-sectional view of the barrels shown in FIG. 2 taken along the lines 3—3 of FIG. 2.

Referring now to FIG. 3, there is shown a cross-sectional, top view of portions of bins 20 and 21. Again, walls or bulkheads 10 and 31 are shown supporting bearing contacts 24 and 30, respectively. Shafts 18 and 18A are arranged in an appropriate manner in contact bearings 24 and 30, respectively. Each of bearing contacts 24 and 30 includes a conductive portion 24A and 30A, respectively. These conductive portions are connected to the conductors shown in FIG. 2 and establish contact with respective shaft portions 18 and 18A. Thus, the contact from the source through to the respective shaft is established.

Shaft portions 18 and 18A are separated by a suitable distance represented by gap 41. The ends of shafts 18 and 18A are maintained in alignment by means of a suitable insulating connector 40. Connector 40, which may be a plastic sleeve for example, maintains the ends of shaft 18 and 18A is proper alignment while maintaining the shaft ends separated wherein the opposite polarity electrical signal applied to respective shafts is maintained. A plating material basket 49 carrys the plating material 44. Basket 49 is suspended from shafts 18 and 18A by means of suitable hook-like members 42 and 43. Typically, basket 49 is electrically non-conductive material such as an acrylic plastic or the like. In a preferred embodiment, one of the hook elements, for example hook 42, is electrically connected to rim 51 which supports basket 49. The other hook, for example hook 43, is electrically connected to material 44 in basket 49. In addition, dangling elements 45 are electrically connected to rim 51 wherein the "danglers" are electrically connected to the source associated with shaft 18. Conversely, material 44 is electrically connected to the source associated with shaft 18A as described infra.

A plurality of internal channel walls 47 are disposed around the inner surface of bin 20. Each of the channel walls is a relatively thin, elongated member that has a height which is substantially less than the radial, dimension of the bin. For example, walls 47 have a height which is indicated by a cross-sectional end portion 47A thereof. Thus, walls 47 define a channel or groove around the inner surface of bin 20. This channel is essentially helical in configuration. The helical channel is adapted to receive incoming material 14 via the chute member 100. Bulkhead 100 which typically is substantially semi-circular in configuration covers about one-half of the interior of bin 20. This bulkhead causes material 14 to be deposited in the first portion of the spiral groove. In this manner, material 14 is prevented from being discharged from chute 100 into the middle region of bin 20 and, thus, adversely affecting the plating process.

As bin 20 rotates the material is automatically translated along the length of the bin by means of being translated helically through the channel defined by walls 47. The material propagates past the plating area represented by basket 49 and associated materials and, ultimately, is received at the end of the channel. The end of the channel is defined by end wall 46 which includes a plurality of perforations therein. Consequently, as the plated material is rotated by bin 20, out of the plating solution, the solution will drain through the perforations in wall 46. As bin 20 continues to rotate, the drained and plated material will be directed against wall 48 which forms a chutelike arrangement which directs the plated material out of the end of bin 20 toward the next stage or apparatus. In a preferred embodiment, a further chute-like arrangement 102 is arranged to receive the material from chute 48 of bin 20 and to direct the plated material to the next bin, such as bin 21, or any additional apparatus in the equipment. Thus, it is seen that the material to be plated has been deposited into bin 20 by chute 100, translated through bin 20 past the plating stage and thence into output chute 48. The plated material is dumped from this chute after having solution drained therefrom through perforated end portion 46, into the next piece of apparatus via chute 102.

Figure 4:
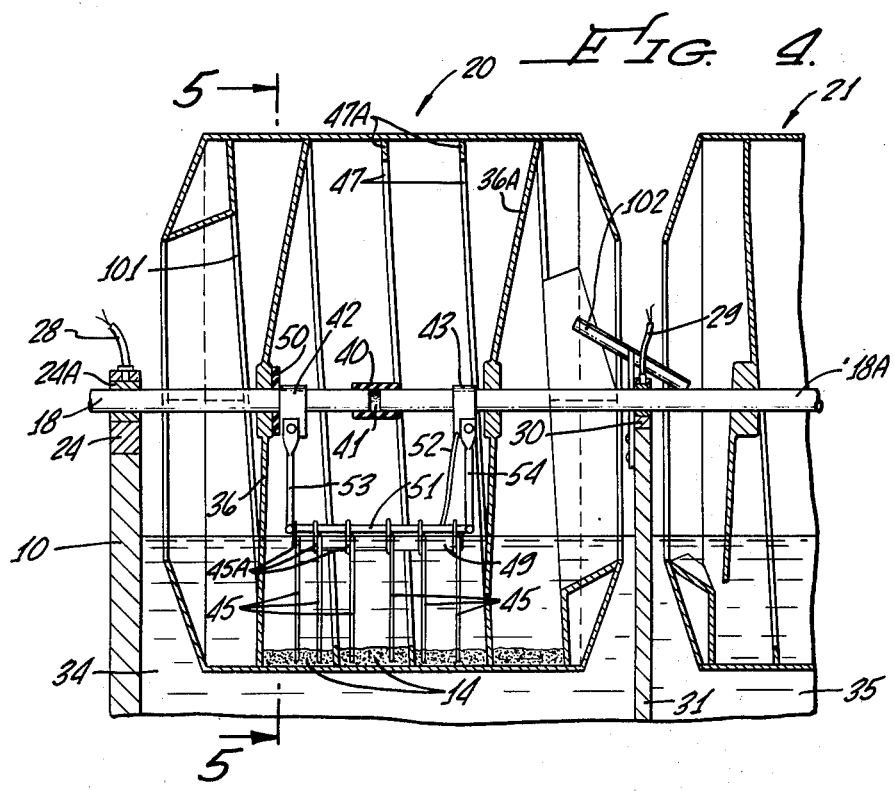
FIG. 4 is a side, cross-sectional view of the barrels shown in FIGS. 2 and 3.

Referring now to FIG. 4, there is shown a cross-sectional side view of the portions of the apparatus shown in FIG. 1. In the side view, bin 20 and a portion of bin 21 are depicted. Again, the bins are located in suitable tanks with the bulkheads 10 and 31 utilized to separate the respective solutions 34 and 35. In addition, bulkheads 10 and 31 support bearing contacts 24 and 30 as well as chute 102, as described supra. Shaft 18 is supported by bearing contact 24 while shaft 18A is supported by bearing contact 30. The ends of the respective shafts are held together by insulating connector 40 such that gap 41 is maintained therebetween. Conductive hook brackets 42 and 43 are arranged to contact and hang from shafts 18 and 18A, respectively. Hook 42 is connected to rim 51 by means of conductive element 53. Similarly element 54 is utilized to connect hook 43 to basket 49. However, as will become more readily apparent subsequently, connector rod 54 is insulated from one of the members 43 and 49. Thus, rim 51 is insulated from one of the members 43 and 49. Thus, rim 51 achieves one polarity as determined by the source (not shown) connected to shaft 18. The material 44 in basket 49 is connected to conductor hook 43 by means of connector element 52 which is fabricated of electrically conductive material. Consequently, the plating material receives a different polarity from the charge or signal applied to rim 51. Dangler elements 45, as noted supra, are fabricated of electrically conductive material. These rods are connected to rim 51 to thereby achieve the same electrical status. The danglers 45 depend from rim 51 into solution 34 and, as will be seen, into contact with the material 14, being translated through bin 20 for electroplating. Again, the helical path or groove is defined by walls 47 (of height 47A). It is seen that the material which entered from the left end of bin 20 by the appropriate means (for example chute 100 of FIG. 1), generally abut bulkhead 101 and are directed into the groove or channel defined by walls 47. The rotation of bin 20 causes the material in the channel to be translated from left-to-right by means of the channel walls 47. Again, when the material has reached the end of the channel, it is dumped onto chute 102 which directs the material into the next apparatus such as bin 21.

Referring now to FIG. 5, there is shown an end view of the apparatus which end view is partially sectioned. The illustration in FIG. 5 suggests the generally octagonal shape of bin 20. The bin is seen to comprise an outer peripheral "skin" 55 which is preferably a perforated covering, for example fabricated of a relatively inert plastic type material such as polypropylene or the like. A plurality of upstanding walls 47 are affixed to each section of the outer skin 55. The upstanding walls 47 are arranged on the "skin" sections in a slightly skewed manner, as shown supra, to essentially describe and define a helical channel around the inner surface of skin 55 of drum or bin 20. Walls 56 and 57 are similar to walls 47 except that they are somewhat higher in height and are arranged substantially adjacent to the ends of the bin. These walls are displaced higher than the top surface of wall 47, primarily because of the tapered end configuration of bin 20 and function to confine and direct material 14 during the plating operation.

Chute 48 is connected to walls 56 and 57 and to the channel described by walls 47. Chute 48 serves to direct the plated material 14 from bin 20 into the next adjacent apparatus as described supra. Chute 48 includes the perforated end portion 46 which represents the end of the helical channel in bin 20. Because of the perforations, the solution is permitted to drain from the plated material as it is effectively, scooped from the solution, such that an excess of the solution is neither lost to the plating operation nor imposed upon the subsequent apparatus.

Also shown in FIG. 5 is the relative arrangement of bulkhead or strut 36A which supports shaft 18A along with hook 42 which is engaged with shaft 18. The coupling or connector 53 between hook 42 and rim 51 is also illustrated. The danglers 45 are shown as comprising essentially three rows of conductor rods which depend from rim 51. The rows have relatively diminishing length with the shortest being the first dangler row to encounter the material 14 as the material circulates through bin 20. In addition, danglers 45 include a loop comprising at least one turn of the conductor. This loop or turn permits danglers 45 to exhibit greater flexibility and resilience whereby these elements can flex and follow material 14 in the bin. As suggested supra, danglers 45 serve to apply an electrical signal of one polarity to material 14 while the solution and the plating material are charged to a different plurality. In order to facilitate this operation and to provide better charge contrast, danglers 45 may be coated with an insulating material along the length thereof except for a short portion at the tip which exposed tip portion contacts material 14.

Referring now to FIG. 6, there is shown a more detailed, perspective view of the plating material apparatus. Again, shafts 18 and 18A are held in alignment by insulating member 40 with gap 41 between the ends thereof. Hooks 42 and 43 engage shafts 18 and 18A, respectively, Conductor 53 connects hook 42 with rim 51 in order to apply the electrical signal thereto. Danglers 45, including the respective loops 45A therein, are joined to rim 51 to receive the electrical signal therefrom.

Connector 54 is also connected to rim 51 to add support thereto. However, connector 54 is isolated from hook 43 by means of insulating pad 58. A suitable insulated coupling is provided relative to the rivet or screw 59, as well. However, hook 43 is electrically connected to material 44 by means of conductor 52. Material 44 is stored in basket 49 which is typically, a relatively inert plastic type material which has perforations therein. The perforations permit the solution to engage and interact with material 44 such that this material will go into solution and be plated on material 14. Inasmuch as material 44 receives one electrical signal and, thus, electrical charge of one polarity, and the materials contacted by the ends of danglers 45 receive a charge of an opposite polarity, material 44 is deposited on material 14 in the usual electroplating fashion.

Referring now to FIG. 7, there is shown another partially broken away, partially sectioned end-view of bin 20. This view is taken along the lines 7—7 of FIG. 3. Again, the outer periphery or skin 55 is shown connected to and supportive of interior walls 47. Walls 47, as noted, terminate in perforated end wall 46 which is associated with chute 48. As suggested, material 14 is confined by walls 47 to be translated through the helical path defined by these walls.

In FIG. 7, arrow 103 represents the clockwise rotation of bin 20 of this embodiment. As bin 20 rotates in the clockwise direction, material 14 in the bottom-most section of the octagonal channel will be translated, as suggested by arrow 104, into the next portion of the channel when it becomes the bottom-most portion. Subsequently, material 14 will continue to be translated toward wall 46 as bin 20 continues to rotate. As soon as side 60 of bin 20 achieves the 9 o'clock position, material 14 begins to drain such that any solution in the channel passes through perforated end portion 46 back into the tank. In addition, as bin 20 continues to rotate, the substantially drained and electroplated material 14 is transferred by gravitational force into chute 48 as suggested by arrow 105. In this condition, chute 48 will be at the upper portion of the bin and the material will automatically slide down chute 48. Chute 48, as described supra is arranged to direct this plated material to the next region of the apparatus via chute 102 (See FIG. 2).

FIG. 8 represents the details of output chute 48. In FIG. 8 the perforated end portion 46 is shown. The output chute members are shown in relation to perforated end wall 46. Material 14 is shown adjacent the bottom of bin 20. The arrangement shown in FIG. 8 corresponds to the situation wherein chute 48 and perforated end portion 46 of side 60 of bin 20 are in the 6 o'clock position. (Reference is made to FIG. 7 as well.) It is seen that when side 60 achieves the 9 o'clock position as described supra, material 14 is basically resting against perforated end wall 46 and the appropriate solution is draining through this end wall. When the chute achieves the 12 o'clock position (see FIG. 7), it is clear that material 14 will drop down into chute 48 for disbursement into the next location in the apparatus.

Referring now to FIG. 9, there is shown an illustrative version of chute 102 which may be utilized to transfer material from bin 20 to bin 21 (or any other bin). Typically, chute 102 is a curved member which forms a trough or similar configuration. In a preferred embodiment, chute 102 is fabricated of an inert plastic such as an acrylic or the like. Chute 102 is fastened in a suitable manner, for example by an adhesive or the like, to support member 110. Support member 110 is mounted on a bulkhead, such as bulkhead 31, by means of a suitable fastening arrangement 111. This fastening arrangement my be in the form of nuts and bolts, rivets or any other suitable arrangement. Chute 102 is affixed to support member 110 in such a manner that chute 102 receives material from chute 48 of bin 20, for example, and deposits the material into the channel in the next adjacent bin, for example, bin 21. Thus, chute 102 is generally angulated relative to support member 110. Arrows 106 and 107 indicate the path followed by material from chute 48 through chute 102 into the next bit of apparatus. The specific form of chute 102 is not essential to the invention, per se. However, an illustrative description and showing thereof is deemed advantageous in understanding the operation of the invention.

Thus, there is shown and described an improved, modular barrel plating mechanism. The mechanism assures that a prescribed amount of material to be plated is translated through a plating process in a controlled manner as to time in the solution and amount of material to be plated at any given time. A preferred embodiment shown and described herein includes a plurality of perforated bins of generally octagonal configuration. In any particular process, the number of bins utilized is a function of the process. The size of the bins is also a function of the desired process and the like. Many types and sizes of drums or barrels can be utilized while incorporating the thrust of the instant invention. Those skilled in the art may perceive modifications to the invention described herein. However, any modifications which fall within the purview of this description are intended to be included as well. The preferred embodiment described herein is intended to be illustrative of a mode of fabricating and utilizing the instant invention. However, this description is not intended to be limitative but is illustrative only. The scope of the invention is defined by the claims appended thereto.

Having thus described a preferred embodiment of the invention, what is claimed is:

1. A plating mechanism comprising:
   at least one drum rotatably mounted to pass through a plating medium,
   a continuous channel defined on the inner surface of said drum to define a path for transporting material through said drum as said drum rotates,
   a substantially centrally located rod means passing through the axis of rotation of said drum,
   said rod means includes at least two electrically conductive rod members adapted to receive different electrical signals, and
   insulating means arranged to join said rod members in non-conductive fashion.

2. The plating mechanism recited in claim 1 including;
   chute-like means formed at one end of said continuous channel to expel said material from the interior of said drum after said material has been transported through said drum.

3. The plating mechanism recited in claim 2 wherein;
   said chute-like means includes a perforated end wall for supporting and draining the transported material prior to expulsion thereof from the interior of said drum.

4. The plating mechanism recited in claim 1 wherein;
   said drum to form said channel is substantially octagonally shaped, and
   a plurality of walls are formed on the interior sides of said drum.

5. The plating mechanism recited in claim 1 including;
   struts formed diagonally across said drum for supporting said rod means,
   drive means connected to said rod means for rotating said rod and said drum.

6. The plating mechanism recited in claim 1 including;
   support means for supporting plating material inside said drum, said support means including a pair of hook members adapted for individual engagement with different ones of said rod members, and a plurality of strands of electrically conductive material depending from said support means to engage material being transported through said drum.

7. The plating mechanism recited in claim 6 including;

trough means supported by said support means, said trough means retaining said plating material.

8. The plating mechanism recited in claim 7 wherein; said trough is comprised of electrically non-conductive material.

9. The plating mechanism recited in claim 6 wherein; each of said strands includes a loop therein to provide resilience to said stand.

10. The plating mechanism recited in claim 1 including;

wall means constructed across a portion of said drum adjacent one end thereof to direct material into said continuous channel at a prescribed location.

* * * * *